United States Patent Office 3,443,618
Patented May 13, 1969

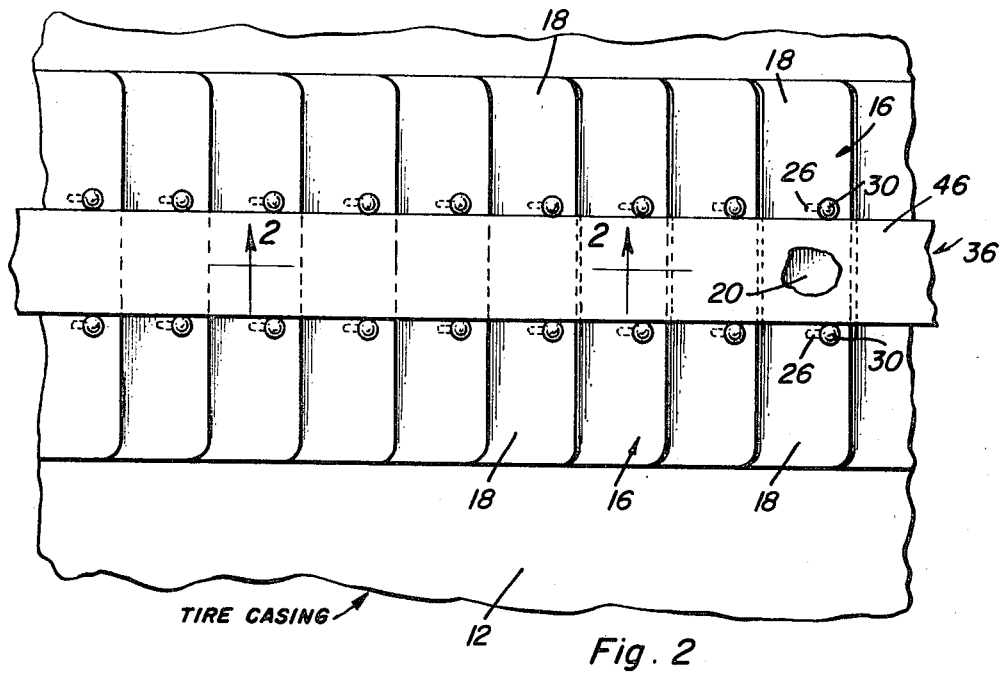
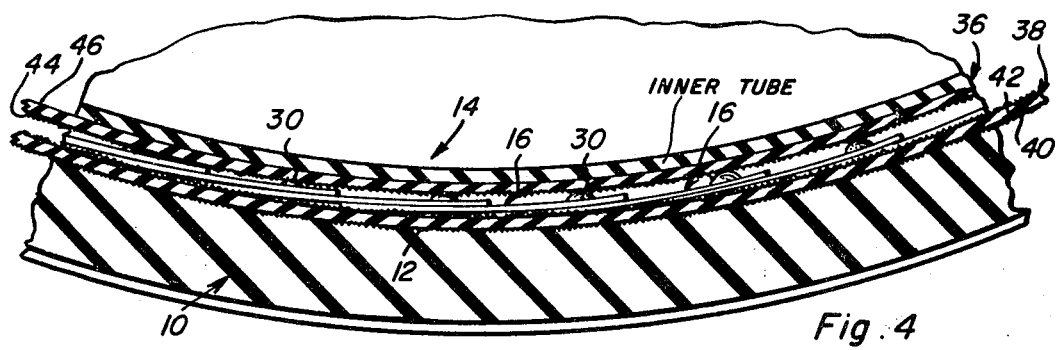
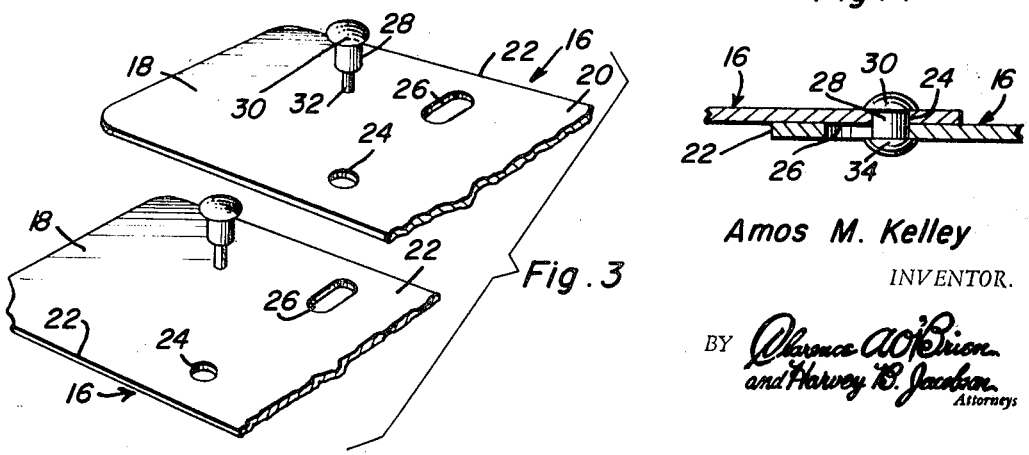

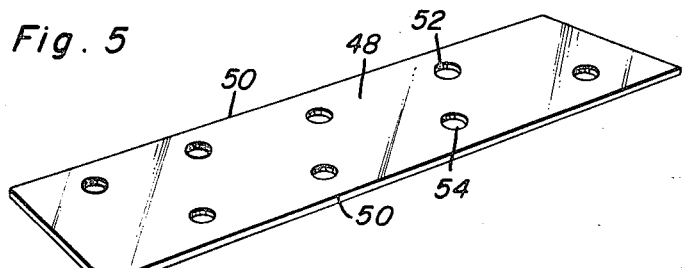
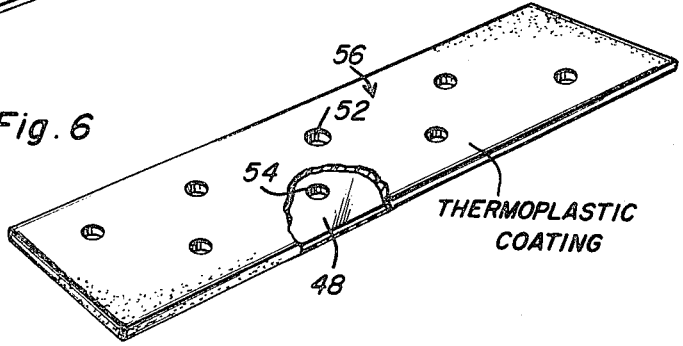
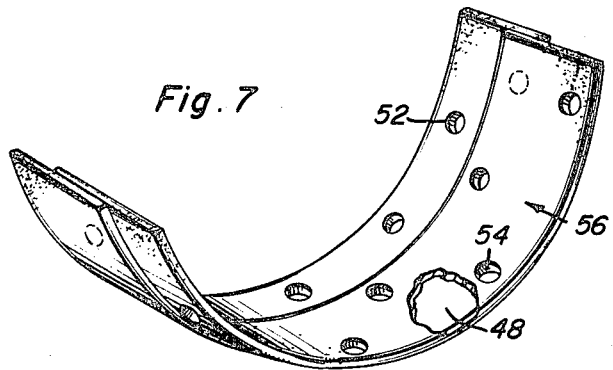
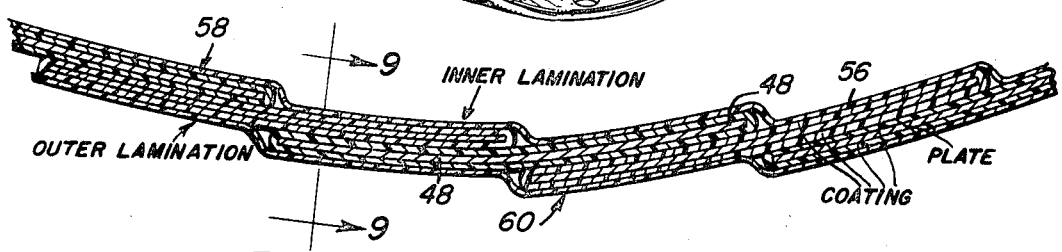
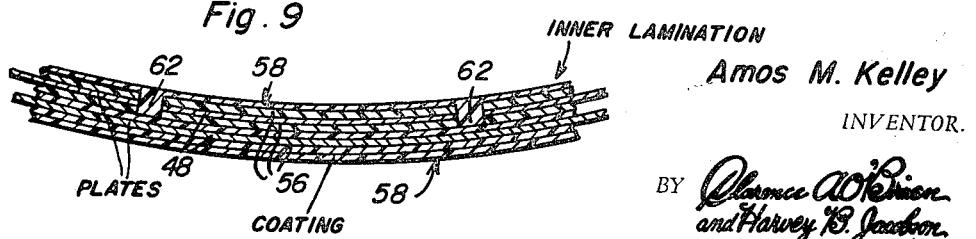

3,443,618
PUNCTURE-PROOF TIRE LINER
Amos M. Kelley, Rte. 1, Box 121A,
Refugio, Tex. 78377
Filed Jan. 24, 1967, Ser. No. 611,298
Int. Cl. B60c 9/00, 5/02
U.S. Cl. 152—206                                5 Claims

ABSTRACT OF THE DISCLOSURE

A tire armoring interliner sandwiched between the interior of a tire casing and tube and characterized by an endless annulus. This annulus is made up of companion flexible and resilient rectangular metal cleat-like plates with lengthwise edges overlapping in fish-scale-fashion. In one form the plates are (A) riveted together and in second form the plates are (B) plastic-coated overlapped and confined in a snug-fitting but elastic jacket.

Background of the invention

This invention pertains to certain new, useful and distinctively unique improvements in an endless annular liner capable of being manually inserted and interposed between tread portions of the carcass of a tire casing and a coacting pneumatic inner tube and which, as above disclosed, armors the tire and tube and, in so doing, serves to minimize the likelihood of puncturing the tube.

The idea of puncture-proofing pneumatic tires with interliners is old and well known. For example concavo-convex plates defining a "fish-scale-like" armoring shield with the overlapping plates movably linked to each other is shown in a patent to Chabot 1,181,841. Another and similarly constructed and performing interliner and protector is revealed in Bailey et al. 967,704 and jacket-enclosed bendably resilient cleats are featured in Vanderperre-Simon, Patent 771,190. Other prior art is known but, being non-analogous, is not here cited.

Inasmuch as prior art interliners are not in widespread use is indicative of the fact that the tire liner problem still exists. Therefore, the object here is to promote progress in this field of invention and, in so doing, to offer an adaptation (two embodiments) which can be endorsed by tire makers, retailers, safety councils, dealers and vehicle owners and operators.

Summary

Generically, the herein disclosed concept pertains to a structure wherein overlapping metallic plates (usually but not necessarily rectangular) are made of thin flexible non-corrodible or stainless steel or equivalent sheet material and are oriented and responsively movably coordinated to provide the expansible and contractible annular armor desired. Complete flexibility to cope with tire rotation and inflation requirements is assured. Effectual and satisfactory self-adapting interaction between the tube, casing and intervening liner is achieved. Also, because of the component parts used and their compensating coaction with each other and the tube and casing, respectively, the improved results desired have been accomplished.

One embodiment (FIGS. 1 and 2) has to do with thin flexible rust-resisting steel plates having half-portions which are overlapped and joined by rivets sliding in suitable slots. The rivets and slots are located at the respective median portions and are arranged in circumferentially paralleling rows. Inner and outer relatively narrow rubber or equivalent elastic strips are provided and encompass the yieldable plates. When installed in the tire, the outer adhesive strip lies between the rivets and also between the tire and the metallic liner and is adhesive on both sides. The inner encircling strip functions to separate the metallic liner from the inner tube. This rubber liner is adhesive on the side facing the metallic liner but is not adhesive on the side toward the inner tube. Upon inflation, the inner tube expands the thin rubber liner which in turn expands the metallic liner to a larger circular shape to fit the inside contour of the tire. The outer adhesive strip slips enough to allow the metallic liner to expand fully, but the outer strip is constantly adhesive to both the metallic liner and the tire. The metallic liner is directional and is installed inside the tire so that as the tire rotates, the descending plates overlap to the outside of the next upper plate, thereby angling a potential puncturing object (nail or the like) to the outside and keeping it from getting between the plates.

During the installation process, the tube is inflated and deflated at least four times to allow all the liner parts to expand completely and fully before the tire is put into service.

The other embodiment comprises, briefly stated, similar bendably resilient plates each of which is thin-covered with a coating of bonded rubber or heat resistant thermoplastic material.

The coated plates are placed between thin layers or laminations of rubber in an overlapping relationship (FIG. 8). When all plates are in place on one thin layer of rubber, another layer of rubber is placed on top of the plates, and the whole unit is vulcanized to provide a puncture-proofing unit. The holes in the rubber-covered plates allow rubber to be continuous between said plates, and the rubber between the plates is not only bonded to the individual plates but flows through existing holes and is vulcanized to the outer and inner layers of rubber on both sides of the plates. The plates are thus held in position with 50% overlap relative to each other and have flexibility because of the rubber plies on both sides of each coated plate.

These together with other objects and advantages which will become subsequently apparent reside in the details of construction and operation as more fully hereinafter described and claimed, reference being had to the accompanying drawings forming a part hereof, wherein like numerals refer to like parts throughout.

Brief description of the drawing

FIG. 1 is a fragmentary plan view showing significant portions of the interliner in top plan and with the inner tube removed and showing a portion of the tire casing.

FIG. 2 is a central longitudinal sectional view taken on an enlarged scale and approximately on the plane of the section line 2—2 of FIG. 1.

FIG. 3 is an exploded perspective view showing end portions of two of the cleat-like plates and the manner in which the holes and slots are provided at the median portion of each plate.

FIG. 4 is a fragmentary sectional view showing the manner in which overlapped longitudinal portions of the plates are riveted movably or shiftably together.

FIG. 5 is a view in perspective, this being the modified form of the invention, and which shows a single bare cleat-like plate.

FIG. 6 is a view in perspective with the thermoplastic or equivalent snug-fitting coating or covering with a portion broken away.

FIG. 7 is a view in perspective showing two of the coated plates and the manner in which lengthwise edge portions are connected together, this view showing the plates in arcuate form to bring out the fact that when in use they are conformable to the contour of the tube and tire casing.

FIG. 8 is an enlarged lengthwise sectional view of the complete interliner that is when the overlapped coated plates are encased within the enclosing sheath or envelope.

And FIG. 9 is an enlarged fragmentary transverse section at right angles to FIG. 8 and which is taken on the plane of the section line 9—9 of FIG. 8.

*Description of the preferred embodiments*

There are two forms of the invention shown. One form is disclosed in FIGS. 1 to 4 inclusive and the other form or embodiment in FIGS. 5 to 9 inclusive.

With reference first to FIGS. 1 to 4 and particularly to FIG. 2 it will be noted that the numeral 10 designates a fragmentary portion of a conventional pneumatic tire casing the interior surface of the carcass of which is denoted at 12. A fragmentary portion of an inflated pneumatic inner tube is denoted at 14. As is customary in this field of invention the interliner means is interposed between the casing surface 12 and the relatively pliant tread surface of the inner tube. The interliner means is here of endless annular form and is made up primarily of a multiplicity of duplicate elongated or substantially rectangular flexible and resilient stainless steel or equivalent bendably resilient plates. These plates when overlapped and interconnected provide the afore-mentioned fish-scale-style annulus. All of the plates are the same in construction and a description of one will suffice here. Each plate is denoted by the numeral 16 and is described as having duplicate transverse end portions 18 and a median portion 20. The junctional area between the median portion and end portions is provided at the left and right thereof with apertures which are arranged inwardly of the lengthwise edges 22. One aperture comprises a round rivet hole 24 and the other one an elongated slot 26. The stout body portion 28 of the coacting rivet is fitted through the hole 24 and is slidingly mounted in the slot 26 in the manner shown in FIG. 4. The head of the rivet is denoted at 30 and the shank at 32, the shank being suitably reduced so that when it is peened as shown in FIG. 4, it provides a plate assembling head 34. It follows that the plates 16 have approximate half-portions thereof overlapped and slidingly riveted together.

The overlapping metallic plates 16 are made of a thin flexible sheet of rust-resistant steel and the length of the plate varies for the size tire which the liner fits. The rivet hole on one side of the plate is the exact size of the rivet which holds the liner together; however, the rivet slot on the other side of the plate is the exact width of the rivet but has a length twice the diameter of the rivet to allow for the flexibility and expansion needed during installation and inflation. The rivet size is approximately 5% of the width of the plate so that there is always ample expansion available.

When the complete endless liner is to be installed in the tire, the plates are all pushed together so that the liner is then contracted to assume its smallest circular size. When in this position the thus plate-equipped liner is wrapped with relatively narrow band-like strips. There is an inner strip 36 and a similar and therefore companion outer strip 38 as is evident in FIG. 2. The outer strip is provided with an adhesive surface 40 for adhesion to the carcass surface 12 and a second adhesive surface 42 which adheres to the plates which are superimposed thereon. The inner strip 36 has an outer adhesive surface 44 and a non-adhesive surface 46, the first surface 44 contacting and adhering to the median surface portions 20 of the plates between the respective left and right rows of rivets. The non-adhesive surface 46 conformingly contacts the tender tread portion of the inner tube. This interliner is unique and different from prior art liners in that (1) it provides two layers of overlapping metal between the tire and the tube, (2) there is complete flexibility for tire rotation and inflation, (3) there is no contact between the relatively tender inner tube and the metallic liner, and (4) the adhesive strip used to hold the metallic liner and the adhesive inner strip which separates the metallic liner and the inner tube holds the metallic liner firmly to the tire after inflation.

It is also reiterated that the novel liner is directional and is installed inside the tire so that as the tire rotates, the descending plates overlap to the outside of the next upper plates thereby turning a potential puncturing device to the outside and keeping it from getting between the plates.

Taking up now the second or alternate embodiment of the concept attention is invited to FIGS. 5 to 9 inclusive. It is thought unnecessary to show the tire, the inner tube or the manner in which this alternate interliner is installed and FIG. 2 is relied upon for this aspect of the matter. All that is necessary here is to describe, it is submitted, the specific construction of the interliner. The interliner as in the other embodiment takes the form of an endless annulus characterized by a plurality of coating duplicate plates. The plates instead of being bare and riveted together as already described are of the modified form shown. Starting with FIG. 5 the bare stainless steel or equivalent flexibly resilient rectangular cleat or plate is denoted by the numeral 48. Arranged inwardly of the lengthwise edge portions 50 are two rows of holes with the holes of one row denoted at 52 and those of the other row at 54. These holes can be punched in the manner suggested in FIG. 5 or they can be punched through after the plate is enveloped or jacketed within a rubber or equivalent thermoplastic coating as denoted at 56 in FIG. 6. In other words, the bare plate could be dipped in the thermoplastic coating and allowed to assume the encased form shown and then the holes 52 can be drilled through the coating and plate. In any event the half-portions of the plates with the holes properly staggered or misaligned are intended to be overlapped in the manner shown in FIG. 7. This view also shows the plates in arcuate or curved form. It would be within the purview of the invention to preform the plates in arcuate form or to make them flat and then allow them to bend to assume the desired shape when fitted between the tire and inner tube (not shown). After the plates are assembled in overlapping coacting relationship they are inserted between laminations or plies of thin rubber or plastic material, the inner ply being denoted at 58 and the outer one at 60. With the coated plates overlapped and thus encased the casing can be regarded as a sheet or an envelope and the whole unit becomes a vulcanized entity as brought out in FIGS. 8 and 9. FIG. 8 shows the manner in which the coated overlapped plates are enveloped and FIG. 9 shows a further feature wherein it will be noted that the rubber between the plates is not only bonded to the individual plates but portions thereof flow through the holes to provide interconnecting lugs or plugs as denoted at 62 in FIG. 9. The plates are accordingly held in overlapping positions relative to each other and achieve the flexibility attainable by the rubber which is on both faces or sides of the individual coordinating plates.

Inasmuch as the manner of constructing the component parts to provide the ready-to-use interliners has been set forth orderly and systematically, it is believed that it is unnecessary to go into greater detail as to the manner in which the respective interliners are installed. This is to say, FIG. 2 should be ample to show the manner or mode of use. Accordingly, a more extended description is deemed to be unnecessary.

The foregoing is considered as illustrative only of the principles of the invention. Further, since numerous modifications and changes will readily occur to those skilled in the art, it is not desired to limit the invention to the exact construction and operation shown and described.

What is claimed as new is as follows:

1. For use between opposed coacting surfaces of (1) a tire casing and (2) the tread portion of a pneumatic inner tube: an improved substantially puncture-proof interliner comprising, an endless annulus made up of a plurality of thin flexible plates, said plates being alike and elongated and conformable, when forcibly flexed and bowed lengthwise, to conform to the mating contour of the interior tread portion of said tire casing and the pliant peripheral tread surface of said pneumatic inner tube, longitudinal edge portions of adjacent ones of said plates being overlapped and conformingly operatively joined together to define and provide said annulus, and inner and outer elastic members, said plates being sandwiched between said inner and outer members, respectively, said plates being shiftably joined together by plate-mounted rivets with end portions extending through and slidable in slots provided for the coacting ends of said rivets, said slots and rivets being confined in their positions to the median portion of each plate and accordingly being spaced inwardly from the respective transverse end portions of the plates, there being two circumferential rows of rivets and companion slots, and said rows being disposed in spaced apart parallel relationship, said inner and outer members each comprising a relatively narrow pliant strip, said strips being confined to the space between said rows of rivets, both sides of the outer strip being adhesive, the side of the inner strip next to said plates being adhesive and the side next to and contactable with the inner tube being non-adhesive.

2. The interliner according to claim 1 and wherein said strips are of a width equal to about one-third (⅓) the length of each plate and of a thickness to coincide with the heads of the rivets so as to prevent said heads from having damaging engagement with either the tire casing or inner tube, as the case may be.

3. For use between opposed coacting surfaces of (1) a tire casing and (2) the tread portion of a pneumatic inner tube: an improved substantially puncture-proof interliner comprising, an endless annulus made up of a plurality of thin flexible rust resisting plates, said plates being alike and elongated and being conformable, when forcibly flexed and bowed lengthwise, to conform to the mating contour of the interior tread portion of said tire casing and the pliant peripheral tread surface of said pneumatic inner tube, longitudinal edge portions of adjacent ones of said plates being overlapped and conformingly operatively joined together to define and provide said annulus, and inner and outer elastic members coacting with each other, said plates being sandwiched between said inner and outer members, respectively, each plate being completely covered and encased by a thin thermoplastic coating, the latter bonded to the coacting surfaces of said plates.

4. The interliner according to claim 3, and wherein said plate and coating having anchoring holes punched therein, said holes being arranged in rows just inwardly of each longitudinal edge of the plate and the holes of one row being staggered and accordingly disaligned with the holes of the other row.

5. The interliner defined in and according to claim 4 and wherein the thus hole-equipped overlapped and coated plates are linked together within the snug fitting confines of a pliant sheath-like jacket characterized by inner and outer thin rubber marginally connected laminations, said laminations having lug-like protrusions plugged into said holes and thus joining the plates in fish-scale-relationship to provide a self-contained and self-adjusting annulus.

References Cited
UNITED STATES PATENTS

| | | | |
|---|---|---|---|
| 771,190 | 9/1904 | Vanderperre-Simon | 152—206 |
| 784,738 | 3/1905 | Giara | 152—206 |
| 967,704 | 8/1910 | Bailey et al. | 152—206 |
| 1,177,930 | 4/1916 | Cohrs | 152—206 |
| 1,181,841 | 5/1916 | Chabot | 152—206 |

ARTHUR L. LA POINT, *Primary Examiner.*

CHARLES B. LYON, *Assistant Examiner.*